3,408,368
METHODS OF PRODUCING THE BISULPHITE ADDUCT OF 2-METHYL-1,4-NAPHTHOQUINONE

Jean Louis Emile Pomot, Neuilly-sur-Seine, France, assignor to North American Philips Company, Inc., New York, N.Y., a corporation of Delaware
No Drawing. Filed Oct. 27, 1965, Ser. No. 505,398
Claims priority, application France, Oct. 27, 1964, 992,791
4 Claims. (Cl. 260—396)

ABSTRACT OF THE DISCLOSURE

Prepare the bisulfite adduct of naphtho-2-methyl-1,4-naphthoquinone by the reaction of sulfurous acid on an alcoholic solution of 2-methyl-naphthoquinone while keeping the reaction medium at an acid pH.

---

The invention relates to a novel method of producing the bisulphite adduct of 2-methyl-1,4-naphthoquinone, also referred to as menadione bisulphite.

The importance of the bisulphite adduct of 2-methyl-1,4-naphthoquinone, usually termed menadione bisulphite is known in pharmacology and as a water-soluble vitamin K in fodder. This application requires a great purity, which can be attained by the known methods only at the expense of the yield.

The best known methods usually consist in reacting an excess quantity of sodium bisulphite or sodium metabisulphite in a concentrated aqueous solution with 2-methyl-1,4-naphthoquinone, while the temperature is kept below 40°, and while the resultant bisulphite product, which is readily soluble in water, is expelled from the solution by adding sodium chloride. The resultant crude product contains, after filtering, rinsing and drying at low temperature, sodium chloride and an excess quantity of sodium bisulphite and it is usually coloured to a greater or lesser extent in accordance with the degree of purity of the 2-methyl-1,4-naphthoquinone used as the starting material. This crude product is usually purified by recrystallisation in water; in view of the high solubility of the bisulphite adduct of 2-methyl-1,4-naphthoquinone in this cold solvent the yield of crude product is materially reduced.

All present methods of producing satisfactorily pure menadione bisulphite fulfilling the international standards of the pharmacopoeia includes two production steps:

(1) production of a crude product on the basis of technical 2-methyl-1,4-naphthoquinone directly obtained by oxidation of 2-methyl-naphthalene.

(2) purification of this crude product by recrystallisation.

The present invention has particularly for its object to produce the bisulphite adduct of 2-methyl-1,4-naphthoquinone in a single process in such a state of purity that it can directly be used in pharmaceutic preparations, and is stable for a long period of time.

The invention is particularly concerned with a method of producing such a product of high purity in an economic yield by converting the 2-methyl-1,4-naphthoquinone into the bisulphite adduct.

According to the invention the bisulphite adduct is produced in an alcoholic medium by the reaction of sulfurous acid with 2-methyl-naphthoquinone dissolved in an alcohol and by maintaining the pH value of the reaction medium between 1.5 and 5 by adding simultaneously an aqueous sodium hydroxide solution.

The alcohol is preferably a primary or secondary alcohol, having 3 to 5 carbon atoms, for example propylalcohol, isopropylalcohol, butylalcohol, isobutylalcohol or amylalcohol, in which the 2-methyl-1,4-naphthoquinone is soluble, whereas the corresponding bisulphite adduct is practically insoluble therein. For economic reasons use is preferably made of isopropylalcohol.

The alcohol volume employed may lie between 1 and 10 parts of alcohol to one part of 2-methyl-1,4-naphthoquinone, preferably 5 parts of alcohol to one part of menadione.

The overall weight of sulfurous acid may lie between 100 and 125% of the theoretical quantity, preferably between 64 and 80 g. per mol of menadione. However, it is advantageous to restrict the weight of sulfurous acid to 110%, preferably to 105% of the stoichiometric quantity.

The method according to the invention is further characterized in that aqueous sodium hydroxide solution is simultaneously added in a concentration such that this solution introduces at least 5 and at the most 12 mol of water per mol of sodium hydroxide into the reaction medium, that is to say a concentration between 15 and 42% by weight, while constantly checking the pH. The quantity of soda lye is preferably 25%.

The addition of sodium hydroxide preferably does not start until the pH of the menadione suspension in the alcohol is at a value between 1.5 and 3.5, preferably at 2.5 by the addition of a quantity of gaseous sulphur dioxide. While $SO_2$ is gradually added, the pH is maintained between 3 and 4 by adding sodium hydroxide an the reaction is terminate by raising the pH to 4.5.

The temperature of the reaction medium rises automatically during the reaction and it is maintained between 35° C. and 45° C., preferably between 36° C. and 40° C., either by controlling the addition of $SO_2$ and sodium hydroxide, or by cooling.

As gaseous sulphur dioxide and sodium hydroxide are added, the non-dissolved menadione is dissolved, while the bisulphite adduct appears in the form of white flakes.

After the simultaneous addition of gaseous sulphur dioxide and of sodium hydroxide, the product is stirred for about 15 minutes at 35 to 40° C., after which the mixture is cooled to 0° C.–10° C. and filtered.

The product is washed on the filter with the same anhydrous alcohol as that used for the reaction until the washing liquid is colourless. The product is washed and dried either in air or in vacuo, the temperature being kept below 40° C.

The alcohol obtained after filtering and washing is substantially free of water and may be purified by simple distillation without rectification and it may again be used for a further process.

Starting with 172 g. (1 mol) of crude menadione of 95%, 250 to 270 g. of a white substance is obtained, which contains by the U.S.P. standard analysis the following constituents: crystal water 11 to 12%; content of menadione 96 to 100%.

The invention will be described with reference to the following example, but it is not restricted thereto.

EXAMPLE

A 2-litre flask having a good agitator, a thermometer, a supply duct for gaseous sulphur dioxide opening out below in the flask, and a dripping funnel is provided with isopropanol, 0.9 litre, to which is added, while stirring, powdery, crude 2-methyl-1,4-naphthoquinone, 175 g.

The dropping funnel with sodium hydroxide communicates with the interior of the flask through a cock controlled by a pH meter, the electrodes of which are dipped in the reaction mixture.

25% sodium hydroxide 160 g. is introduced into the flask.

The pH meter is adjusted so that by the automatic control of the flow the sodium hydroxide of the pH value is maintained at 3.5.

While stirring vigourously, first a flow of gaseous sulphur dioxide (from a vessel containing it in the liquid state) is introduced into the mass at a rate of 25 litres an hour, the addition being checked by a flow meter.

The sodium hydroxide solution starts dripping in when the pH of the reaction mixture attains 3.5.

For the whole duration of the reaction the temperature is maintained between 35° and 40°.

The flow of gaseous sulphur dioxide is stopped when the weight of the vessel of liquid sulphur dioxide is reduced by 68 g. which takes about one hour. At the same time dripping of the sodium hydroxide solution is terminated and the pH is adjusted to 4.5 by adding a few drops of said solution. Stirring is continued for about 15 minutes, while the temperature is maintained between 25° and 40°.

The product is then cooled to 5°.

The product is filtered, sucked off, washed on a filter with 0.2 litre of isopropanol. The product is then dried in vacuo while the temperature is kept below 40°.

265 g. of quite pure menadione bisulphite is obtained, which contains according to the U.S.P. standard analysis: crystal water 11.4%, content of menadione 97.3%.

What is claimed is:

1. A method of producing the bisulfite adduct of 2-methyl-1,4-naphthoquinone comprising treating, at about 35° C. to 45° C., a solution of 1 part of 2-methyl-1,4-naphthoquinone in about 1 to 10 parts of a saturated aliphatic alcohol of 3 to 5 carbon atoms with sulfurous acid while maintaining the pH of said solution between 1.5 and 5 by the simultaneous addition of sodium hydroxide.

2. The method of claim 1 wherein isopropyl alcohol is employed.

3. The method of claim 1 wherein from 100% to 125% of the theoretically required quantity of sulfurous acid is employed.

4. The method of claim 1 wherein an aqueous solution of sodium hydroxide is employed and the water introduced by this solution ranges from at least 3 to at most 12 mols per mol of the sodium hydroxide.

References Cited
UNITED STATES PATENTS 2,367,302   1/1945   Moore et al. _____ 260—396

LORRAINE A. WEINBERGER, *Primary Examiner.*

L. A. THAXTON, *Assistant Examiner.*

PATENT OFFICE

Washington, D.C. 20231

UNITED STATES PATENT OFFICE
CERTIFICATE OF CORRECTION

Patent No. 3,408,368                                                    October 29, 1968

Jean Louis Emile Pomot

It is certified that error appears in the above identified patent and that said Letters Patent are hereby corrected as shown below:

Column 1, line 48, "pharmacopoeia" should read -- pharmacopia --.
Column 3, line 15, "25°" should read -- 35° --.

Signed and sealed this 10th day of March 1970.

(SEAL)
Attest:

Edward M. Fletcher, Jr.                          WILLIAM E. SCHUYLER, JR.
Attesting Officer                                          Commissioner of Patents